US012486971B1

(12) United States Patent
Weizel

(10) Patent No.: US 12,486,971 B1
(45) Date of Patent: Dec. 2, 2025

(54) PERSONAL HEADLAMP SYSTEM WITH DETACHABLE POWER-SOURCE/AUXILIARY LIGHT SUBSYSTEM

(71) Applicant: Daniel Nissan Weizel, Tel Aviv (IL)

(72) Inventor: Daniel Nissan Weizel, Tel Aviv (IL)

(*) Notice: Subject to any disclaimer, the term of this patent is extended or adjusted under 35 U.S.C. 154(b) by 0 days.

(21) Appl. No.: 18/909,044

(22) Filed: Oct. 8, 2024

(51) Int. Cl.

| | |
|---|---|
| ***F21V 21/096*** | (2006.01) |
| ***F21L 4/08*** | (2006.01) |
| ***F21V 21/084*** | (2006.01) |
| ***F21V 23/00*** | (2015.01) |
| ***F21Y 115/10*** | (2016.01) |

(52) U.S. Cl.

CPC ............ *F21V 21/0965* (2013.01); *F21L 4/08* (2013.01); *F21V 21/084* (2013.01); *F21V 23/006* (2013.01); *F21Y 2115/10* (2016.08)

(58) Field of Classification Search

CPC .. F21V 21/084; F21V 21/0965; F21V 21/096; F21V 21/0885; F21V 23/006; F21L 4/08; F21L 4/085

See application file for complete search history.

(56) References Cited

U.S. PATENT DOCUMENTS

| | | | | |
|---|---|---|---|---|
| 9,829,182 | B1 * | 11/2017 | McCaslin | F21L 2/00 |
| 10,670,201 | B1 * | 6/2020 | Noble | F21L 4/005 |
| 2009/0070967 | A1 * | 3/2009 | Gonzalez | A45C 13/30 362/217.1 |
| 2018/0231234 | A1 * | 8/2018 | Bian | F21V 23/0414 |
| 2020/0248896 | A1 * | 8/2020 | Gall | F21V 21/0816 |
| 2021/0310641 | A1 * | 10/2021 | Grider | F21V 17/002 |
| 2022/0178522 | A1 * | 6/2022 | Cabot | F21V 21/0816 |
| 2023/0324032 | A1 * | 10/2023 | Kaye | F21L 4/027 362/398 |

FOREIGN PATENT DOCUMENTS

| | | | |
|---|---|---|---|
| CN | 202972581 U | * | 6/2013 |
| CN | 106287306 A | * | 1/2017 |

* cited by examiner

*Primary Examiner* — Erin Kryukova

(74) *Attorney, Agent, or Firm* — Robert Brownstein

(57) ABSTRACT

The invention is a personal headlamp with attached light subsystem and a power-source/auxiliary light that can be quickly detached or attached to an attachment fixture, affixed to the headband. The power-source/auxiliary light subsystem may be attached or detached without having to remove the headband from a user's head.

8 Claims, 6 Drawing Sheets

PERSONAL HEADLAMP SYSTEM WITH DETACHABLE POWER-SOURCE/AUXILIARY LIGHT SUBSYSTEM

TECHNICAL FIELD

The invention is a personal headlamp system.

BACKGROUND OF INVENTION

Personal headlamps have been around at least since the 19th century. Electrical versions date back to early 20th century. Modern personal headlamps using light-emitting diode (LED) light sources were introduced in the 1970s.

Modern personal headlights have benefitted from smaller, lighter-weight batteries and LED light sources.

Currently, personal headlamps comprising rechargeable batteries, LED light sources and adjustable headbands are available with a variety of light intensities and weight.

Personal headlamps offer a way to work in the dark and have full use of both hands. However, to use the light subsystem as a handheld light source, one must remove the headband and light as an inseparable unit because personal headlamps essentially mount the light subsystem permanently to the headband.

BRIEF DESCRIPTION OF INVENTION

The invention disclosed is a modern personal headlamp with adjustable headband, an attached light subsystem, and an easily attached or removable power-source/auxiliary light subsystem that can be used as a handheld light by disengaging from an attachment fixture without having to remove the headband from one's head. The power-source/auxiliary light may be reattached by reversing the process, as well. The power-source/auxiliary subsystem may be used to power another device having a compatible power-conveyance interface.

The personal headlamp system comprises an adjustable headband, an attached lighting subsystem, an attachment fixture, and a power-source/auxiliary light subsystem operative to be quickly attached to or detached from the attachment fixture.

The power-source/auxiliary light subsystem comprises a rechargeable battery module, a microcontroller, and a LED module. These components are housed in an enclosure that has a battery charger interface connector, a power interface to the headband light subsystem, and an aperture and transparent covering allowing the light to pass out of the enclosure with minimal loss in intensity.

DETAILED DESCRIPTION OF INVENTION

Modern personal headlamps have been in use for nearly half a century that comprise LED light sources, batteries and adjustable headbands.

These personal headlamps are very useful where a person is working in low-light or darkness and needs use of both hands.

Where a user needs a handheld light, temporarily, and opts to use the personal headlamp, the headband and light subsystem are not detachable, and the user must hold both headband and light subsystem as an inseparable unit.

The invention herein disclosed is a modern, personal-headlamp system comprising an adjustable headband, an attached light subsystem, and having an attachment fixture operative to enable easy attachment to, and detachment from, the headband's attachment fixture by a power-source/auxiliary light subsystem.

A key characteristic of the attachment and detachment structure is to be able to attach or detach without having to remove the headband from a user's head. The attachment fixture and power-source/auxiliary light subsystem counterparts must provide firm attachment despite a large number of attachment/detachment events. Firm attachment is defined as essentially secure attachment under ordinary head movement.

User comfort is directly dependent upon overall system size and weight. Thus, the attachment fixture and its power-source/auxiliary light subsystem counterparts should add minimal weight compared to a light subsystem permanently affixed to its headband and containing a power source.

A rechargeable-battery charger port should be accessible whether the light subsystem is attached to or detached from the headband.

The following descriptions and their related drawing figures are meant to make the structure and functions of the system more clear.

Figure 1:
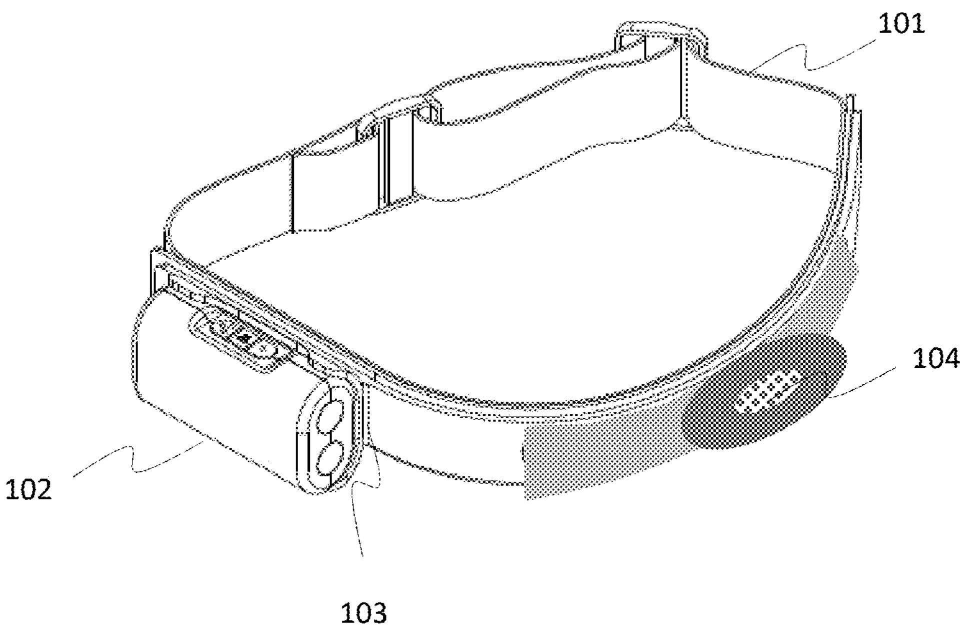
FIG. 1 shows a perspective view of the personal headlamp system with power-source/auxiliary light subsystem attached to an attachment fixture

In FIG. 1, an adjustable headband (101), with attached light subsystem (104) has a permanently mounted attachment fixture (103) which interfaces with a power-source/auxiliary light subsystem (102). FIG. 1 shows the system with the power-source/auxiliary light subsystem attached to the attachment fixture.

Figure 2:
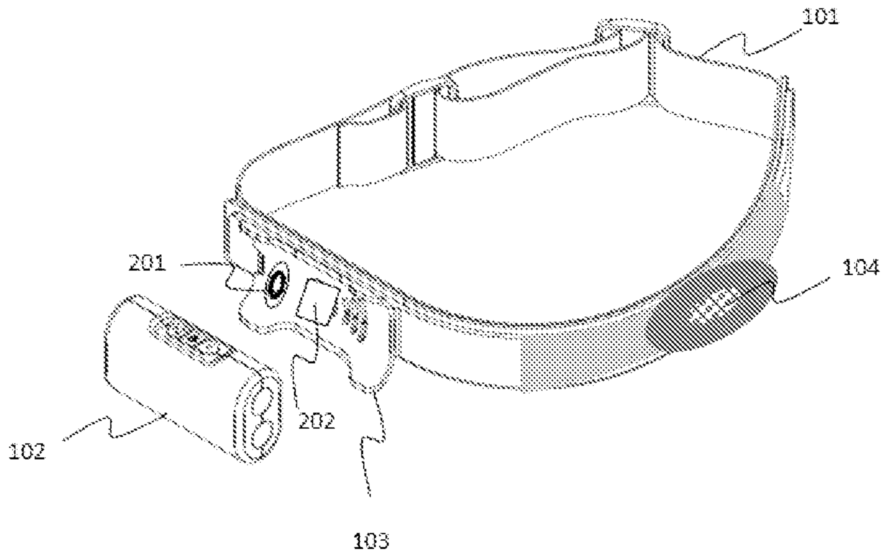
FIG. 2 shows a perspective view of the system of FIG. 1 wherein the power-source/auxiliary light subsystem is detached from the attachment fixture.

In FIG. 2, the same objects as in FIG. 1 are now shown with the power-source/auxiliary light subsystem (102) detached from the attachment fixture (103). An interface (201) conveys power-source power to the attached light subsystem (104).

Figure 3:
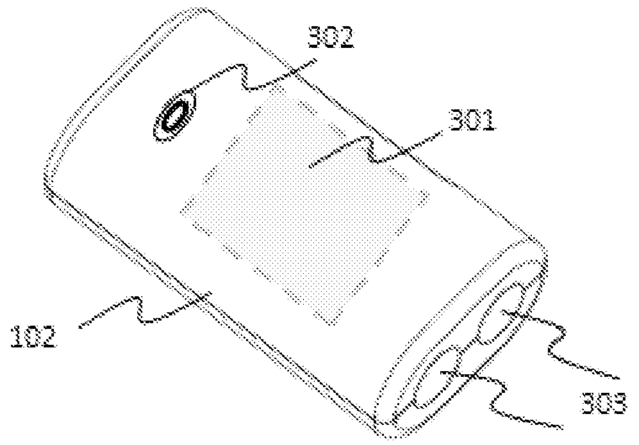
FIG. 3 shows a ferromagnetic structure contained within the power-source/auxiliary light subsystem enclosure that serves as an element of a magnetic attachment fixture arrangement.

In one embodiment, as shown in FIG. 3, the attachment fixture uses magnetic force to hold the power-source/auxiliary light subsystem in place. To that end, the power-source/auxiliary light subsystem, 102, has a ferromagnetic structure (301) located inside its enclosure and attached to the side that is closest to the attachment fixture when attached. On that same side is a battery-charger port interface (302) that interfaces with interface 201. At least one aperture and transparent cover, 303, enables light to exit the enclosure in a forward direction when affixed to the attachment fixture (FIG. 1, 103). The ferromagnetic structure and the attachment fixture's sufficiently strong magnet can be selected to provide the firm attachment as earlier defined.

Figure 4:
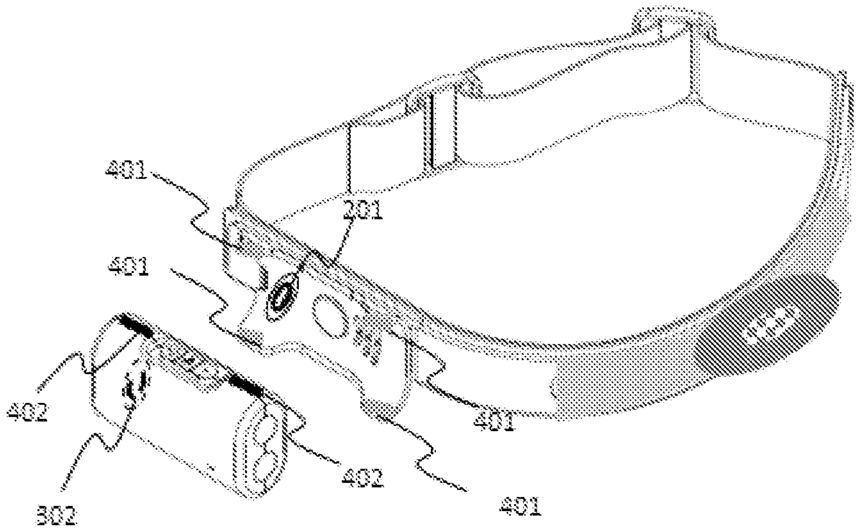
FIG. 4 shows an attachment fixture that uses tabs that interface with depressions on the two opposite edges of the power-source/auxiliary light subsystem's enclosure.

In another embodiment, as shown in FIG. 4, an attachment figure comprises four tabs (401) as shown which interface with depressions in the power-source/auxiliary light subsystem's enclosure's outer edges (402). These depressions are in the upper and lower edges of the light subsystem when mounted to the attachment fixture. The battery-charger port interface, 302, on the side closest to the attachment fixture, provides a mating interface to 201.

Figure 5:
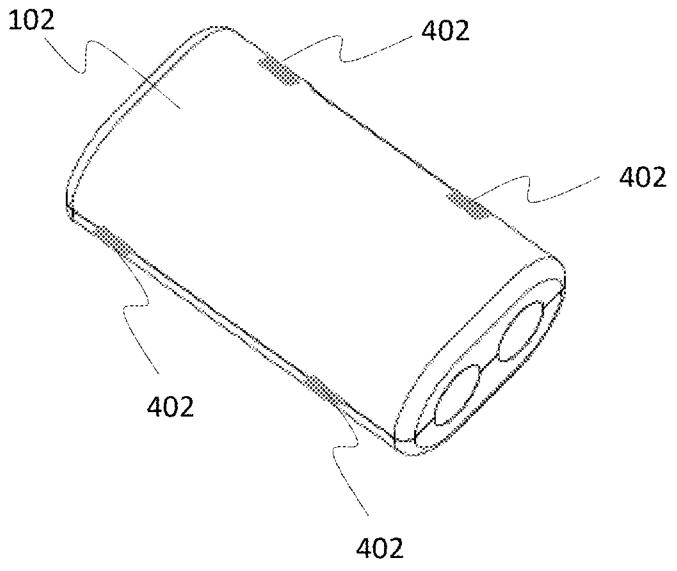
FIG. 5 shows another view of the power-source/auxiliary light subsystem's enclosure and a plurality of depressions that interface with the headband's attachment fixture.

In FIG. 5, the power-source/auxiliary light subsystem is shown such that all four depressions (402) can be seen. When interfaced to the attachment fixture and its four tabs, the power-source/auxiliary light subsystem will be held firmly in place.

Figure 6:
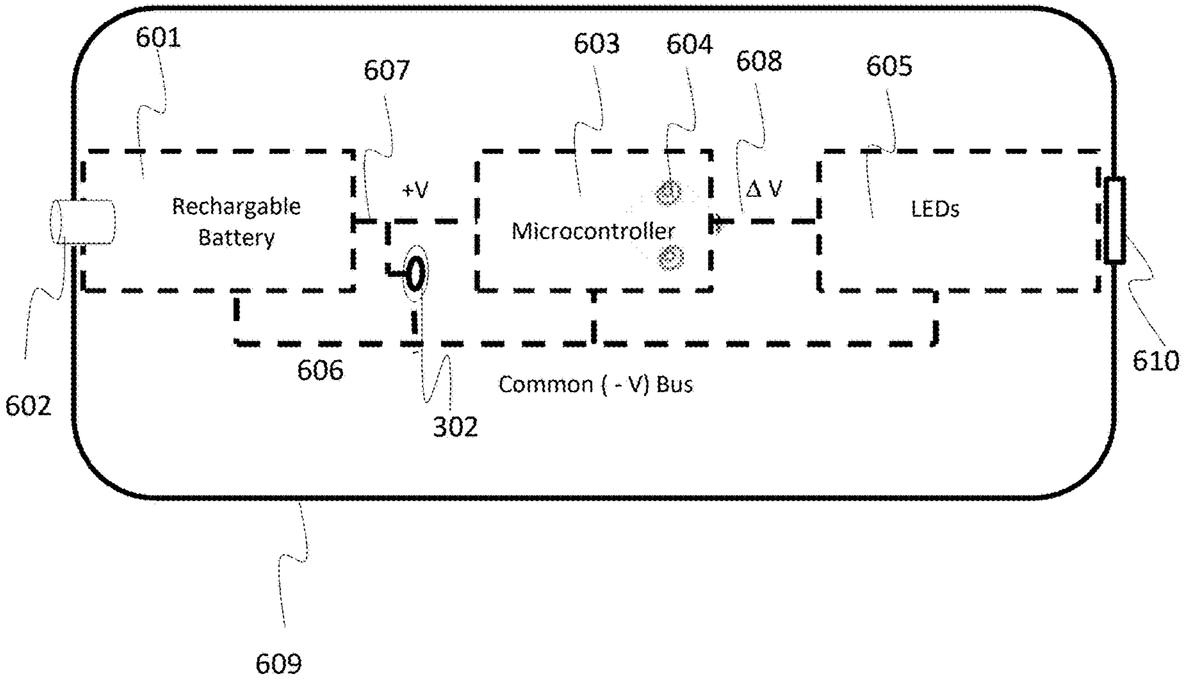
FIG. 6 shows a system view of the power-source/auxiliary light subsystem's functional blocks and their interrelationships.

FIG. 6 shows the light subsystems functional blocks. A rechargeable battery component (601) is operative to provide electrical energy for the LED component (605). Intervening between battery 601 and LEDs 605 is a microcontroller operative to control the voltage level, ΔV, which is conveyed to the LED module. The value of ΔV will be equal to or less than the current value of +V, the battery voltage conveyed to the microcontroller. As shown, the modules are connected to a common bus (−V), and the microcontroller responds to user inputs on controls (604) which are accessible from outside the enclosure. A battery-charger port (602) is located on an edge of the light subsystem that is accessible when attached to, or detached from, the attachment fixture, and is located on a rear-facing edge when attached to the attachment fixture and worn on a user's head. At the edge opposite the battery-charger port, an aperture (610) enables LED light to exit the enclosure with minimal loss in intensity, and a transparent cover seals the aperture. The power-source interface (302) is connected to the rechargeable battery's positive and negative electrodes via the common bus (606) and the +V bus (607).

The headband can be made of non-stretch material wherein the adjustment fixtures allow essentially no slippage when adjusted. Alternatively, the headband may be made of stretchable material making adjustment slippage less of an issue.

The attachment fixture, if magnetic, must comprise a magnet structure. It can be a metallic form that is left exposed or covered with a non-magnetic material, such as plastic.

If the attachment fixture uses physical structures, such as the tabs described, it could be made of metal having initial flexibility and resting rigidity, such as spring steel, to support attachment and detachment processes, but once the power-source/auxiliary light subsystem is attached, the metal should provide rigid spring pressure so as to meet the firm attachment characteristics as defined.

Attachment fixtures may comprise alternative structures so long as they meet the firm attachment qualification.

The drawings and descriptions are exemplary and should not be read as limiting the scope of claims.

What is claimed is:

1. A personal headlamp system with detachable auxiliary power and light source comprising:
- an adjustable headband;
- an attached light subsystem disposed on a front of a user's head;
- an attachment fixture permanently affixed to the adjustable headband so as to be on a side of the user's head;
- a detachable power-source/auxiliary light subsystem, operative to be readily detached and reattached, to the headband on the side of the user's head, without removing the headband, comprising:
  - an enclosure;
  - a rechargeable battery module;
  - a microcontroller;
  - a user-control interface;
  - a LED module;
  - a battery-charger port; and
  - an electrical interface for conveying battery power to the attached light subsystem.

2. The system, as in claim 1 wherein:
the adjustable headband is non-stretching.

3. The system as in claim 1 wherein:
the adjustable headband comprises stretchable material.

4. The system as in claim 1 wherein:
the attachment fixture uses a magnet to apply magnetic force to provide firm attachment.

5. The system as in claim 1 wherein:
the attachment fixture uses tabs that correlate to depressions in the power-source/auxiliary light subsystem's enclosure's outer edges to enable stable attachment and easy detachment and reattachment.

6. The system as in claim 1 wherein:
the LED module comprises one or more LED light sources.

7. The system as in claim 1 wherein:
the rechargeable-battery module comprises one or more individual rechargeable batteries.

8. The system as in claim 1 wherein:
the enclosure has the battery-charger port interface on a side face of the enclosure closest to the attachment fixture, when attached to the attachment fixture and worn on a user's head; and
the enclosure has at least one aperture and transparent cover on a front-facing edge when attached to the attachment fixture and worn on the user's head.

* * * * *